US007926610B2

(12) United States Patent  (10) Patent No.: US 7,926,610 B2
Adli  (45) Date of Patent: Apr. 19, 2011

(54) HOT COMPRESSED GAS VEHICLE (76) Inventor: Manoucher Adli, Redondo Beach, CA (US)

( * ) Notice: Subject to any disclaimer, the term of this patent is extended or adjusted under 35 U.S.C. 154(b) by 267 days.

(21) Appl. No.: 12/293,538

(22) PCT Filed: Mar. 24, 2006

(86) PCT No.: PCT/US2006/010783
§ 371 (c)(1),
(2), (4) Date: Sep. 18, 2008

(87) PCT Pub. No.: WO2007/111581
PCT Pub. Date: Oct. 4, 2007

(65) Prior Publication Data
US 2009/0288902 A1  Nov. 26, 2009

(51) Int. Cl.
*B60K 3/00* (2006.01)
*B60K 3/02* (2006.01)
*B60K 3/04* (2006.01)

(52) U.S. Cl. ........ 180/302; 180/303; 180/304; 180/310; 244/53 R (58) Field of Classification Search ........... 180/165, 180/303, 304, 310, 242; 244/53 R, 55
See application file for complete search history.

(56) References Cited

U.S. PATENT DOCUMENTS

| | | | |
|---|---|---|---|
| 1,023,848 A * | 4/1912 | Huff | 280/164.1 |
| 3,847,058 A * | 11/1974 | Manor | 91/474 |
| 4,123,910 A | 11/1978 | Ellison, Sr. | |
| 4,163,367 A | 8/1979 | Yeh | |
| 4,290,268 A | 9/1981 | Lowther | |
| 4,361,204 A * | 11/1982 | Earle | 180/302 |
| 4,383,589 A | 5/1983 | Fox | |
| 4,590,767 A | 5/1986 | Gardner, Jr. | |
| 4,753,078 A | 6/1988 | Gardner, Jr. | |
| 4,798,053 A | 1/1989 | Chang | |
| 5,957,234 A | 9/1999 | Manor | |
| 6,006,517 A * | 12/1999 | Kownacki et al. | 60/370 |
| 6,044,924 A * | 4/2000 | Adli | 180/302 |
| 6,202,782 B1 | 3/2001 | Hatanaka | |
| 6,327,858 B1 | 12/2001 | Negre et al. | |
| 6,397,962 B1 * | 6/2002 | Bllau | 180/65.23 |
| 6,508,324 B1 | 1/2003 | Conley, Jr. | |
| 6,758,295 B2 | 7/2004 | Fleming | |
| 2001/0000284 A1 * | 4/2001 | Whittaker | 180/220 |
| 2005/0224059 A1 | 10/2005 | Negre et al. | |

OTHER PUBLICATIONS

International Search Report and Written Opinion in counterpart PCT application No. PCT/US06/10783, dated Mar. 13, 2007.

* cited by examiner

*Primary Examiner* — J. Allen Shriver, II
*Assistant Examiner* — Bryan A Evans
(74) *Attorney, Agent, or Firm* — Chen Yoshimura LLP (57) ABSTRACT

A compressed-air powered drive system for a vehicle (10) or a propeller-driven aircraft (12). In a land vehicle (10), the drive system includes a plurality of air motors (20) each driving a wheel (16) through a transmission device (18). Compressed air from an air storage tank (12) is supplied through a heat exchanger (40) to drive air motors. A fuel is burned in the heat exchanger (40) to provide hot, high pressure air to the first air motors. Water may be injected into the heat exchanger to provide a hot steam. A plurality of air pumps (22) are engaged with and driven by the wheels to pump air into the tank during driving. When braking, the air pumps (22) driven by the wheels (16) recapture kinetic energy by pumping air into the tank. The air motors can also act as pumps to pump air into the tank during braking by reversing the transmission devices.

19 Claims, 5 Drawing Sheets

HOT COMPRESSED GAS VEHICLE

BACKGROUND OF THE INVENTION

1. Field of the Invention

This invention relates to apparatus for powering a vehicle capable of carrying people, cargo, etc. in which the motive energy is derived from compressed air.

2. Description of the Related Art

While most land vehicles, such as automobiles, trucks, etc. and many light aircrafts are powered by internal combustion engines, a number of other drive systems have been proposed. These include gas turbine engines, steam engines, electric battery power, etc. and combinations of these systems. Because of the high state of development of the internal combustion engine and certain problems with these alternative systems such as low efficiency, short range and other problems, none of these alternative systems have come into widespread use. Internal combustion engine vehicles have low energy efficiency. The main reason for this is that in the internal combustion engine, energy produced in the form of hot pressurized gas at combustion is transferred to the wheel by using pistons, crankshaft, transmission, drive shaft, differential, etc., all of which are heavy. They require oil to reduce friction and their weight requires heavy structures for support. Therefore, most of the energy of the hot pressurized gas of combustion is wasted in the form of friction and heat escaping into the atmosphere, making the combustion engine vehicles very inefficient. Thus, both the combustion and the way the combustion energy is transferred to the wheel are inefficient.

Today, with increasing environmental awareness and increasing efforts to reduce pollution, greater attention is being given to drive systems that produce less air pollution than internal combustion engines. Also, internal combustion engines are not fully efficient, wasting considerable amounts of energy in the form of heat that must be passed to the atmosphere though a radiator and exhaust system.

A number of different compressed air powered vehicles have been developed, either fully powered by compressed air or as an assist system to supplement an internal combustion engine. Compressed air drive is quiet, generally has few objectionable emissions and can recover energy wasted during braking and emit little wasted heat energy.

An air assist or hybrid system is described by Ellison in U.S. Pat. No. 4,123,910. An air compressor is powered by a main, internal combustion, engine. The internal combustion engine is used when speeds are in the range in which that engine is most efficient. During driving under conditions in which the main engine is inefficient, such as stop-and-go urban driving, the compressed air powers the same drive train with the main engine turned off. While improving efficiency under limited conditions, this system still has most of the disadvantages of the internal combustion engine and is very heavy, requiring both internal combustion and air drive system, reducing efficiency.

Another hybrid system requiring an electric motor and flywheel drive for an air compressor is described by Yeh in U.S. Pat. No. 4,163,367, and has similar problems with weight and complexity. Other hybrid combinations of an internal combustion engine or battery for compressing air are described by Gardner in U.S. Pat. Nos. 4,590,767 and 4,753,078 and have the same weight and efficiency problems.

An auxiliary system for using braking energy to compress air to supplement a main engine is described by Lowther in U.S. Pat. No. 4,290,268. A similar system is described by Chang in U.S. Pat. No. 4,798,053. Again, as merely a supplement to a main engine, the weight, complexity and cost of the auxiliary system are not generally justified by any efficiency increases.

In U.S. Pat. No. 4,383,589 Fox describes a system using a drive system for each wheel consisting of a motor powered by compressed air from a tank. A compressor is connected to each wheel to feed compressed air to the tank. Since no source of energy is furnished to replenish energy lost to friction in the system, the tank will quickly run out of air. Even if the tank were filled before beginning a drive, the vehicle would have an extremely short range.

SUMMARY OF THE INVENTION

Thus, there is a continuing need for improved vehicle drive systems that are more energy efficient, produce less pollution, transfer power to the motive means in a less complex, lighter weight and more effective manner and recover and use energy dissipated during breaking and coasting.

Accordingly, the present invention is directed to a hot compressed gas vehicle that substantially obviates one or more of the problems due to limitations and disadvantages of the related art.

The present invention is an improvement of a hot compressed gas powered vehicle described in U.S. Pat. No. 6,044,924 dated Apr. 4, 2000 by the same inventor.

An object of the present invention is to provide a vehicle drive system that uses air motors powered by compressed hot air/steam as the sole driving force or in combination with other drive system.

An object of the present invention is to provide a compressed hot air/steam powered vehicle that is light weight and energy efficient.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a compressed air powered drive system for a vehicle, which includes a plurality of wheels for engaging the earth's surface, one or more air motors each engaged with a wheel for driving the wheel, an air storage tank for storing compressed air, a fuel storage tank for storing a fuel, a heat exchanger connected to the air storage tank through an air supply valve and connected to the air motors, the heat exchanger heating the air from the air storage tank prior to supplying it to the air motors, the heat exchanger including a burner connected to the fuel storage tank through a fuel supply valve and an ignition device for burning the fuel, wherein the air motors are capable of being driven by high pressure air from the heat exchanger to cause the respective wheels to rotate in a forward direction, one or more air pumps each engaged with a wheel, the air pumps being connected to the air storage tank through a valve, the air pumps being driven by the respective wheels to pump air into the air storage tank when the wheels rotate in the forward direction, and a control device for controlling the air valve, the fuel valve, and the ignition device.

The drive system may further includes one or more first variable speed transmission devices for engaging the air motors with the respective wheels, and one or more second variable speed transmission devices for engaging the air pumps with the respective wheels.

Optionally, water from a water storage tank may be injected into the heat exchanger where the water is converted to steam.

The present invention also provides a compressed air powered drive system for a propeller drive aircraft which includes a propeller shaft for mounting a propeller, an air motor engaged with the propeller shaft, an air storage tank for storing compressed air, a fuel storage tank for storing a fuel, a heat exchanger connected to the air storage tank through an air supply valve and connected to the air motor, the heat exchanger heating the air from the air storage tank prior to supplying it to the air motor, the heat exchanger including a burner connected to the fuel storage tank through a fuel supply valve and an ignition device for burning the fuel, wherein the air motor is capable of being driven by high pressure air from the heat exchanger to drive the propeller shaft, an air pump engaged with the propeller shaft, the air pump being connected to the air storage tank through a valve and being driven by the propeller shaft to pump air into the air storage tank, and a control device for controlling the air valve, the fuel valve, and the ignition device.

It is to be understood that both the foregoing general description and the following detailed description are exemplary and explanatory and are intended to provide further explanation of the invention as claimed.

BRIEF DESCRIPTION OF THE DRAWINGS

Details of the invention, and of preferred embodiments thereof, will be further understood upon reference to the drawing, wherein.

DETAILED DESCRIPTION OF THE PREFERRED EMBODIMENTS

Figure 1:
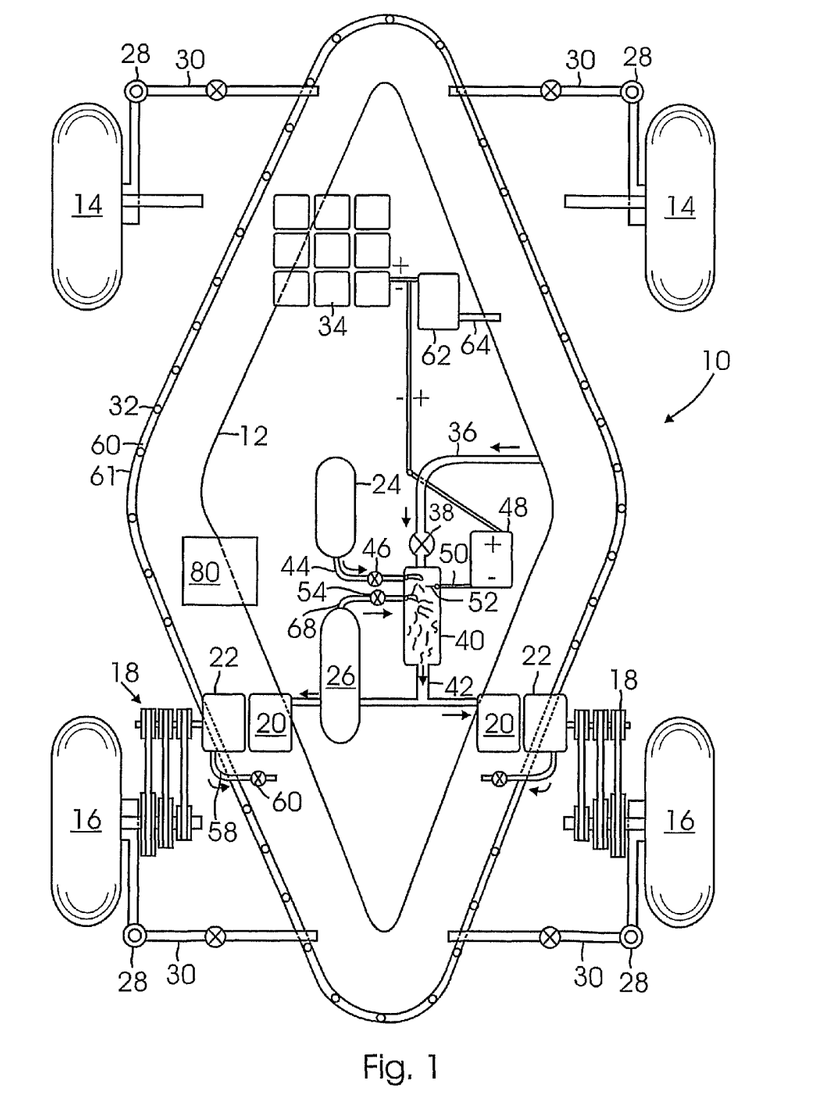
FIG. 1 schematically illustrates a road vehicle using an air powered drive system according to an embodiment of the present invention.

FIG. 1 schematically illustrates a road vehicle 10 such as a passenger automobile or the like using an air powered drive system according to an embodiment of the present invention. An air tank 12 is provided for storing compressed air. In the illustrated example, the tank 12 surrounds the perimeter of a base of the vehicle and has a diamond shape with pointed ends at the front and rear. While this position is preferred since it provides an energy absorbing structure in the event of a collision, the tank 12 may have any suitable shape and can be located in any suitable position. Typically, the tank 12 can accommodate 100 to 1000 or more psi pressure and can be formed from any suitable material, such as metals, fiber reinforced plastics such as carbon fibers in a resin matrix, etc.

The vehicle 10 is supported on a plurality of conventional wheels. Here four wheels including two forward wheels 14 and two aft wheels 16 are shown. An air motor 20 through a variable speed transmission devices 18 drives each aft wheel 16, or each front wheel 14, or both (FIG. 1 shows air motors only for the aft wheels). The transmission device 18 may be a belt and pulley type transmission, with different belts selectively engaged to pulleys of different diameters to vary speed, or variable gears of the sort used in multi-speed bicycles. In FIG. 1, a transmission 18 with a three-speed hub in the center of the wheel is shown. Other suitable types of transmission devices may be used, such as a fluid drive, etc.

The air motor used in embodiments of the present invention is a device that has a stator, a rotor rotating around a shaft, and a plurality of vanes on the rotor, where the stator and the rotor form an air chamber with an inlet and an outlet (exhaust). Pressurized air enters the chamber via the inlet, expands while driving the rotor, and exhausts to the atmosphere via the exhaust. Such air motors are well known in the art and commercially available. In addition to vane air motors, other types of air motors may also be used.

The air motors 20 are powered by high-pressure air from the tank 12. As shown in FIG. 1, when the vehicle 10 is being driven, the high-pressure air in the air tank 12 flows through a conduit 36 and a valve 38 to a heat exchanger (or burner) 40, where the air is heated to increase the volume and/or the pressure. The hot, high-pressure air is directed through conduits 42 to air motors 20. Air exhausts from air motors 20 to the atmosphere after it is used to drive the air motors.

In order to heat the air in the heat exchanger 40 to increase the volume and/or raise the pressure, a fuel such as propane or any other suitable combustible gas or liquid is supplied to the heat exchanger from a fuel tank 24 through a conduit 44 and a controller 46. Electrical energy to ignite the fuel is supplied from a battery 48 through a wire 50 to a spark plug, glow plug or other igniting means 52.

While hot, high-pressure air from heat exchanger 40 is used to drive air motors 20 and power wheels 16, water can be optionally injected if desired into the heat exchanger from a pressurized water tank 26 through a conduit 68 and a control valve 54. The water will be vaporized by the heat to generate a hot steam, which will result in a combined hot air/steam with increased pressure and/or volume to drive the air motors 20.

Figure 2:
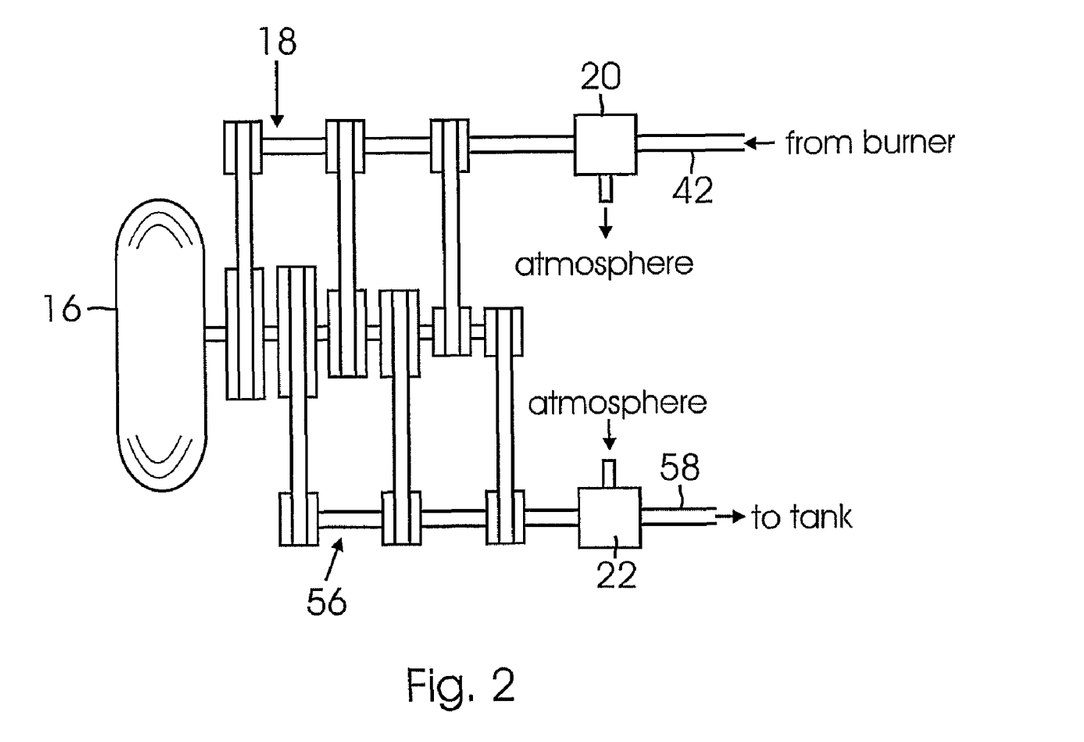
FIG. 2 illustrates an alternative transmission device for the vehicle of FIG. 1.

One or more air pumps (or compressors) 22 are provide, each being driven by a wheel (either a forward wheel 14 or an aft wheel 16) through. In the embodiment shown in FIG. 1, two the air pumps 22 are provided on the two aft wheels 16 and have the same axel as the corresponding air motor 20. The air pumps 22 are preferably air motors having a similar structure as air motors 20 but are driven in the reverse direction, with an air inlet open to the atmosphere and an air outlet connected to the air tank 12 via a conduit 58 and a valve 60. Thus, the air pumps 22 function as air compressors to pump air into the tank 12 as the vehicle moves in the forward direction. As a result, while the vehicle 10 is being driven by the air motors 20, and air in the tank 12 is being used, the air pumps 22 are driven to re-supply air into the tank 12. Since the outlet of the air pumps 22 is connected directly to the tank 12, the pressure to be overcome by the air pumps 22 is the pressure of the tank, which is substantially the same as the air pressure that drives the air motors 22. To provide a net driving power, the air pumps 22 are either smaller in volume than the air motor 20, and/or are fewer in number than the corresponding air motors (e.g. three air motors 20 for each corresponding air pump, not shown in FIG. 3), and/or are driven at a slower rotation speed than the air motors 20 (by using different transmission devices for the air motor 20 and the air pump 22, as shown in FIG. 2 and described below, or by using a gear system that couples the motor 20 and the pump 22 with a fixes a drive ratio). The net driving power is generated by burning the fuel in the heat exchanger to increase the volume of the air (or air/steam combination) that drives the air motors 20.

FIG. 2 shows a partial schematic view of an alternative transmission system for a vehicle 10. Unlike the embodiment in FIG. 1 where the air motor 20 and the air pump are on the same axel, the air motor 20 is connected to the wheel 16 by a transmission device 18 and the air pump 22 is connected to the same wheel 16 by another transmission device 56. This design allows the rotation speed of the air motor 20 and the air pump 22 to be separately controlled.

The conduit 42 has a T structure to direct the hot, high-pressure air from the heat exchanger 40 to the plurality of air motors 20. The T connection serves the function of a conventional differential. When the vehicle is turning, the inside wheel rotates slower than the outside wheel. There is an increased resistance of air flow to the slower wheel, and more air would automatically flow to the other wheel to provide it with more power and cause it to turn faster. In a conventional positive traction differential, if one wheel is spinning due to lack of traction, for example in mud or sand or snow, then more torque and power is directed to the wheel that is not spinning and therefore provide the vehicle with positive traction. To achieve this goal in the present drive system, valves in the conduit 42 leading to different wheels may be provided to regulate the air flow to different air motors.

During braking or downhill coasting when a braking effect is desired to avoid excessive downhill speed, the high-pressure air supply from the tank is shut off by the valve 38 and combustion in the burner is turned off. The air pumps 22 provide a braking effect while pumping air into the tank 12. In addition, the transmission 18 may be designed with an ability to reverse its direction (not shown in FIG. 1 or 2), so that the air motors 20 is driven by the wheels in a reverse direction and act as an air pump when the vehicle is moving forward to pump air into the tank. In such a case, the valve 38 between the air motors 20 and the tank 12 will be open (with the burner 40 turned off). Using the air motors 20 as air pumps provides greater braking force. The degree of braking can be controlled by the transmission devices 56 and/or 18. No fuel is consumed while braking, and the kinetic energy of the vehicle is recaptured and stored as hire-pressure air in the tank 12 to be re-used to drive the vehicle.

A conventional braking actuator (not shown) such as a pedal, knob or the like is operated to initiate braking. When the vehicle is coasting down a long hill, a sensor connected to a throttle control can be used to initiate braking. Additional friction brakes such as parking brakes may be provided for safety.

When the vehicle is stopped, or coasting freely, air pumps 22 will not be operating. The wheels 14 and 16 will turn freely when coasting freely. Fuel delivery and combustion is stopped. Thus, no fuel is consumed while the vehicle is coasting freely or stopped even for short periods, such as at a traffic light.

The air supply valve 38, the fuel supply valve 46, and the water supply valve 54 are preferably electric valves. A combination controller 80 (only schematically illustrated in FIG. 1) is provided to control these valves as well as the ignition control so as to supply adequate amounts of compressed air, fuel and water (if it is used) to achieve desired speed control. The transmission devices 18 and 56 may be controlled by the controller 80, or manually controlled. A microprocessor, an IC chip or hard wired logic circuitry may be used in the controller 80. The implementation of the control is within the ability of skilled artisans in the electrical and mechanical art.

Alternatively, air motors having variable pressure ratios such as those shown by Lowther in U.S. Pat. No. 4,290,268 (FIGS. 1a, 1b) may be used. Such an air motor has a means to change the size of the air inlet or outlet to change the pressure ratio of the air motor or the compressor to achieve variable driving force or braking force. This may augment the transmission devices 18 and 56, or eliminate the need for transmission devices. Lowther also shows a compressor and a motor combined in a unitary device having a motor portion and a compressor portion, which may be used to implement embodiments of the present invention.

Figure 4:
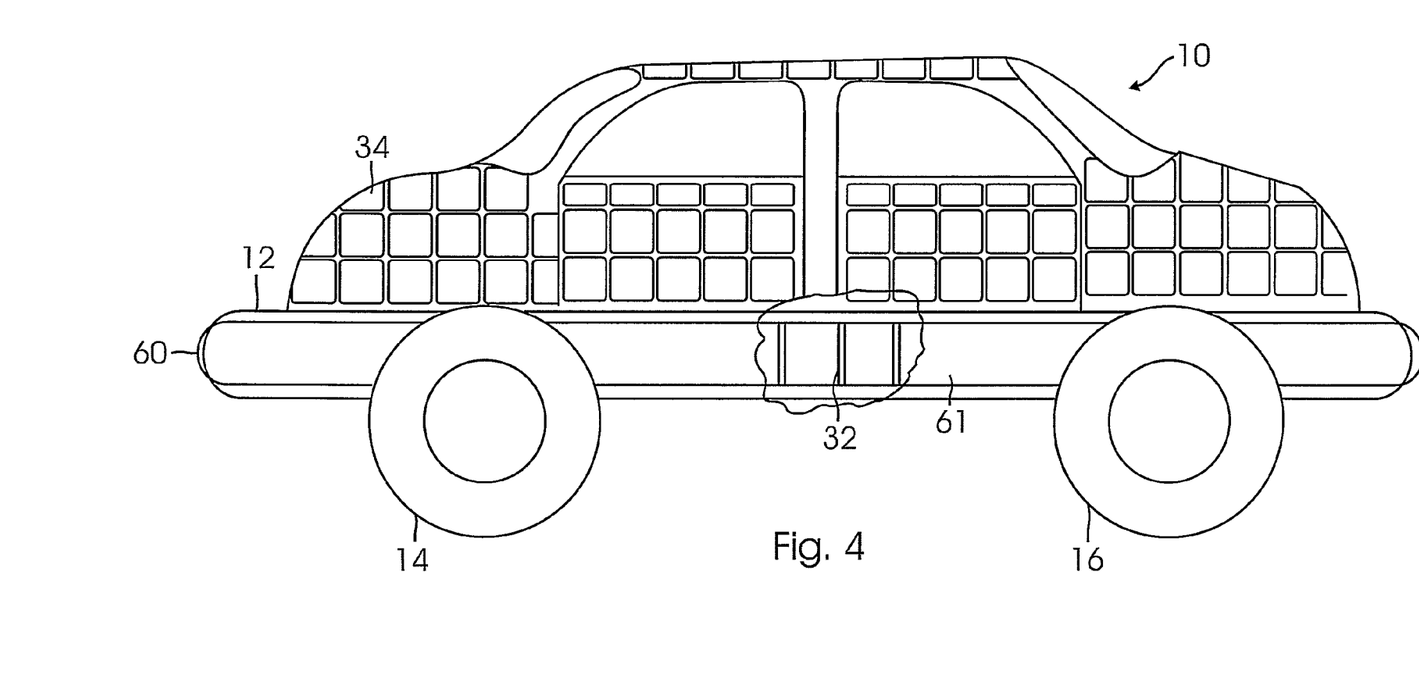
FIG. 4 is a schematic exterior view of a vehicle showing solar panels on the outside of the vehicle according to an embodiment of the present invention.

As shown in FIGS. 1 and 4, the outside surface of the vehicle can be partially or entirely covered with solar cells 34. Solar cells 34 provide electricity to an air compressor 62, which through conduit 64 provides additional source of pressurized air to tank 12 when sunlight is available. Solar cells 34 also charge the battery 48 when needed. Battery 48 or an outside source of electricity can be used to supply power to the air compressor 62 to pump air into tank 12 when the vehicle is parked.

Figure 3:
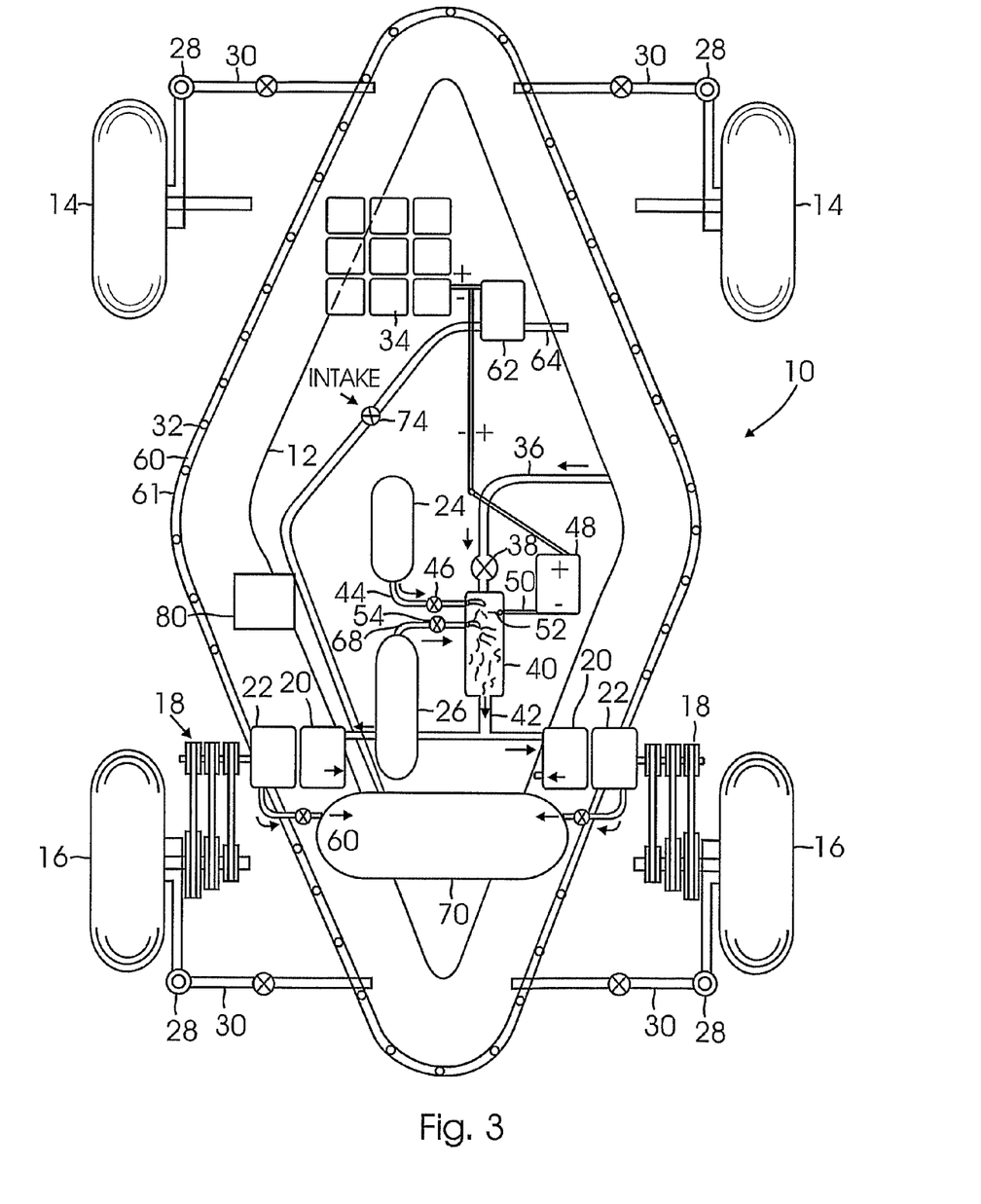
FIG. 3 schematically illustrates a road vehicle using an air powered drive system according to another embodiment of the present invention.

FIG. 3 schematically illustrates a road vehicle 10 using an alternative drive system. The drive system shown in FIG. 3 is similar to that shown in FIG. 1, but has a second air storage tank 70, and compressed air from air pumps 22 during driving, braking or downhill coasting can be directed into storage tank 70. The second air storage tank 70 will normally have lower pressure than the air tank 12, and the air in the second tank 70 is pumped into the tank 12 via a conduit 72 and a control valve 74 by the compressor 62.

In conventional vehicles, energy is wasted in the spring and shock absorber systems. Energy absorbed by these systems is simply dissipated into the atmosphere as heat. In embodiments of the present invention, energy from the spring and shock absorbers can be recovered by connecting small one-way linear piston-in-shaft air pumps 28 to suitable springs and shock absorber points, e.g. between the wheels and the base of the vehicle. The pump is similar to a conventional bicycle pump having a sliding piston on a shaft in a closed tube with one-way intake and outlet valves on opposite sides of the piston. As the spring or shock absorber goes up and down, the piston of the pump 28 will move correspondingly. The output air from these pumps can be directed through conduits 30 to air tank 12.

The vehicle 10 also includes several features that aid in protecting passengers from injury in the event of a collision. As mentioned above, the air tank 12 can be positioned around the passengers at a location where it can absorb impact energy. The tank will, of course, be designed to rupture in a manner rapidly releasing the contained pressurized air in a safe manner. The wheels and other parts attached to the outside of the air tank 12 can be designed to break away from the vehicle in the event of a collision.

A series of spaced vertically disposed, low friction rollers 32 are arranged around the vehicle exterior. A continuous belt 61, typically of a flexible elastomeric material, is mounted on rollers 32, as seen in FIGS. 1, 2 and 3. The continuous belt 61 can also be mounted without the rollers 32 on a lubricated surface, or a slippery surface can be provided instead of the belt 61. If the vehicle 10 should collide at a low angle to another vehicle or object, considerable energy will be absorbed by the belt, which will move with the colliding object. Further, the belt will aid in deflecting the colliding object, allowing the vehicle and other object to strike a glancing blow and move past each other, rather than having the two imbedded into each other so that all energy must be absorbed by crushing structures.

Figure 5:
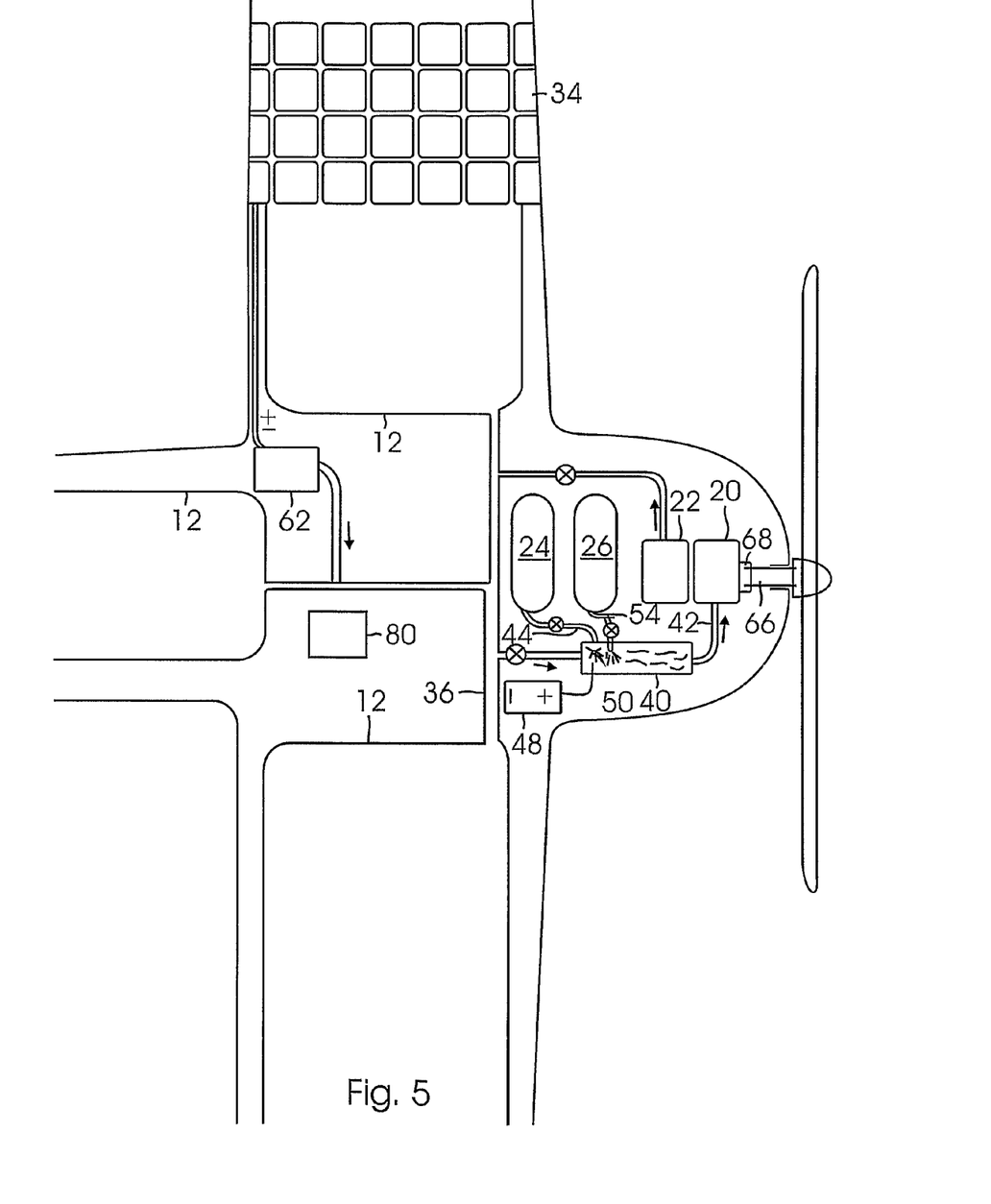
FIG. 5 schematically illustrates an air powered drive system for a propeller-driven airplane according to another embodiment of the present invention.

FIG. 5 schematically illustrates an air pressure drive system suitable for driving an aircraft propeller or other similar rotating shaft according to another embodiment of the present invention. The aircraft includes at least one air tank 12, a heat exchanger 40, a fuel supply 24, a water supply 26, a conduit 44 for supplying the fuel to the heat exchanger 40 and a conduit 54 to supply the water into the heat exchanger 40, an ignition system supplied by a battery 48 to ignite the fuel from the fuel supply 24 in the heat exchanger 40, and a conduit 42 to supply hot pressurized air and/or steam into the air motor 20. Solar cells 34 covering the entire outside upper surface of the aircraft provide electricity to a conventional air compressor 62 to pump air into tank 12 and charge the battery 48, all operating in the manner described above for the land-based vehicle.

The air motor 20 is connected to a propeller shaft 66 though a suitable transmission 68 if needed. The air motor 20 receives air from the higher-pressure heat exchanger as illustrated. At the same time, an air motor 22 is driven by the propeller shaft 66 to operate as an air compressor to re-supply air to the tank 12. In the state illustrated in FIG. 4, cool, high pressure air from the tank 12 passes to the heat exchanger 40 within which a fuel from the fuel supply tank 24 is combusted by means of ignition, and water is injected into heat exchanger 40 and turned into steam. The resulting higher temperature and higher pressure air or air and steam combination passes through the conduit 42 to the air motor 20 which is connected to the propeller shaft 66. Meanwhile, the air pump 22 is operated as a compressor driven by the shaft 66. It takes in the cool outside air, compresses it and directs it to tank 12. The air pump 22 is smaller in volume, fewer in number, and/or driven at a slower rotation speed than the air motor 20 so a net driving force is provided.

A vehicle according to embodiments of the present invention has many advantages over conventional vehicles. First, the vehicle eliminates the pistons, crankshaft, transmission, drive train, and differential, etc. of the conventional drive system. Instead of a series of these heavy mechanical parts, the drive power (pressurizes air) is supplied directly to the air motors which are adjacent to the wheels being driven. As a result, only a simple, light transmission device is needed. Thus, unlike conventional vehicles, a vehicle according to embodiments of this invention is very lightweight. The air tank can be made from very light material such as carbon fiber and also provides the structural support of the vehicle frame. There are no heavy transmissions. Transmission at the wheel much like bicycle transmissions weighs only ounces. There is no need for a mechanical differential; only a simple tee connection can work quit well. Pistons and crankshaft are eliminated. Therefore, the vehicle can weigh one tenth of the weight of conventional vehicles. The amount of energy saved because of the light weight of the vehicle alone is substantial.

Second, when the vehicle is coasting down hill or when braking is desired, no air will need to be sent to the propelling air motors. Some or all of the wheels can drive the air pumps acting as compressors to direct air into the tank. Because of the back pressure on the wheels driving the compressor, a braking effect will occur, which can be increased by varying the gearing between the wheels and the air pumps. Thus, braking energy can be recovered and serves to help fill the tank. Braking forces will be the greatest on the wheels driving air pumps forcing air into the tank. No fuel is used when the air supply to the heat exchanger is shut off during downhill coasting and during braking and waiting at traffic lights.

Third, the vehicle puts very little wasted heat into the atmosphere. Hot pressurized air or hot pressurized air and steam enter the air motors and expand when exiting the air motor. Expansion cools the exiting air, therefore nearly all of the fuel used in the heat exchanger for combustion is turned into energy and used to propel the vehicle.

Moreover, the entire outside upper surface of the land vehicle and the entire upper surface of the aircraft can be covered with solar cells to provide electricity to a conventional electric air compressor to pump air into the air tank on a continuous basis when sun light is available.

Further energy can be recaptured in the form of compressed air by connecting a reciprocating air pump to vehicle springs, shock absorbers, etc. The pump shaft is connected to a reciprocating vehicle part such as a spring or shock absorber so that the pump shaft correspondingly reciprocates, forcing air into a tank through a tube between pump outlet valve and a tank. In this way, energy in the shock absorber system is recaptured in the form of compressed air in the tank 12 and used to drive the vehicle.

The vehicle according to embodiments of the present invention also has a number of safety features. In the event of a collision, the large tubular air tank 12 will serve as significant collision energy absorber. In addition, the ends of the vehicle can be generally pointed so that in a head-on collision or in a rear-end collision with a similar vehicle, the two vehicles would slide away from each other. In a similar situation in colliding with a tree or a telephone pole, the vehicle would slid away with wheels and other external parts designed to break away during such accidents and therefore saving many lives. The vehicle can have a lubricated surface, or a continuous belt around a lubricated surface of the air tank in a horizontal plane, or a continuous belt around the air tank mounted on a plurality of vertical rollers. In a collision at an angle to the vehicle, the colliding vehicle will cause the belt to move along the mounting vehicle surface, causing the colliding vehicle to slide along the surface and do less damage.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

What is claimed is:

1. A compressed air powered drive system for a vehicle, comprising:
   a plurality of wheels for engaging the earth's surface;
   a plurality of air motors each engaged with a wheel for driving the wheel;
   an air storage tank for storing compressed air;
   a fuel storage tank for storing a fuel;
   a heat exchanger connected to the air storage tank through an air supply valve and connected to the air motors, the heat exchanger heating the air from the air storage tank prior to supplying it to the air motors, the heat exchanger including a burner connected to the fuel storage tank through a fuel supply valve and an ignition device for burning the fuel,
   wherein the air motors are capable of being driven by high pressure air from the heat exchanger to cause the respective wheels to rotate in a forward direction;
   a plurality of air pumps each engaged with a wheel, the air pumps being connected to the air storage tank through a valve, the air pumps being driven by the respective wheels to pump air into the air storage tank when the wheels rotate in the forward direction, wherein the air pumps are structurally distinct from the air motors and pump air into the air storage tank while the air motors drive the wheels; and
   a control device for controlling the air valve, the fuel valve, and the ignition device.

2. The drive system of claim 1, further comprising one or more first variable speed transmission devices for engaging the air motors with the respective wheels.

3. The drive system of claim 1, further comprising one or more second variable speed transmission devices for engaging the air pumps with the respective wheels.

4. The drive system of claim 2, wherein the first variable speed transmission devices are reversible in direction, and wherein when the first variable speed transmission devices are in a reverse direction, the respective wheels rotating in the forward direction drive the air motors to pump air into the air storage tank through the air supply valve.

5. A compressed air powered drive system for a vehicle, comprising:
a plurality of wheels for engaging the earth's surface;
one or more air motors each engaged with a wheel for driving the wheel;
an air storage tank for storing compressed air;
a fuel storage tank for storing a fuel;
a heat exchanger connected to the air storage tank through an air supply valve and connected to the air motors, the heat exchanger heating the air from the air storage tank prior to supplying it to the air motors, the heat exchanger including a burner connected to the fuel storage tank through a fuel supply valve and an ignition device for burning the fuel;
a water storage tank;
a conduit connecting the water storage tank through a water supply valve to an interior of the heat exchanger to inject water into the heat exchanger where the water is converted to steam;
wherein the air motors are capable of being driven by high pressure air and steam from the heat exchanger to cause the respective wheels to rotate in a forward direction;
one or more air pumps each engaged with a wheel, the air pumps being connected to the air storage tank through a valve, the air pumps being driven by the respective wheels to pump air into the air storage tank when the wheels rotate in the forward direction, wherein the air pumps are structurally distinct from the air motors and pump air into the air storage tank while the air motors drive the wheels; and
a control device for controlling the air valve, the fuel valve, the ignition device, and the water supply valve.

6. The drive system of claim 1, further comprising a battery for supplying electricity to the ignition device.

7. The drive system of claim 6, further comprising solar cells for charging the battery.

8. The drive system of claim 6, further comprising an electric air pump driven by the battery for pumping air into the air storage tank.

9. The drive system of claim 8, further comprising an auxiliary air storage tank connected to the air pumps and to the air storage tank via the electric air pump, wherein the air pumps pump air into the auxiliary air storage tank when the respective wheels rotate in the forward direction, and wherein the electric pump pumps air from the auxiliary air storage tank to the air storage tank.

10. A vehicle incorporating the drive system of claim 1, further comprising a shock absorber system including a plurality of one-way linear piston-in-shaft air pumps mechanically connected between the wheels and a base of the vehicle, the one-way linear piston-in-shaft air pumps pumping air into the air storage tank as the base moves up and down.

11. The vehicle of claim 10, wherein the air storage tank surrounds the base of the vehicle.

12. The vehicle of claim 10, further comprising a continuous belt arranged around a lubricated surface of the vehicle exterior.

13. A compressed air powered drive system for a propeller drive aircraft comprising:
a propeller shaft for mounting a propeller;
an air motor engaged with the propeller shaft;
an air storage tank for storing compressed air;
a fuel storage tank for storing a fuel;
a heat exchanger connected to the air storage tank through an air supply valve and connected to the air motor, the heat exchanger heating the air from the air storage tank prior to supplying it to the air motor, the heat exchanger including a burner connected to the fuel storage tank through a fuel supply valve and an ignition device for burning the fuel,
wherein the air motor is capable of being driven by high pressure air from the heat exchanger to drive the propeller shaft;
an air pump engaged with the propeller shaft, the air pump being connected to the air storage tank through a valve and being driven by the propeller shaft to pump air into the air storage tank; and wherein the air pump is structurally distinct from the air motor and pumps air into the air storage tank while the air motor drives the propeller shaft; and
a control device for controlling the air valve, the fuel valve, and the ignition device.

14. The drive system of claim 13, further comprising a first variable speed transmission device for engaging the air motor with the propeller shaft.

15. The drive system of claim 13, further comprising a variable speed transmission device for engaging the air pump with the propeller shaft.

16. The drive system of claim 13, further comprising a battery for supplying electricity to the ignition device.

17. The drive system of claim 16, further comprising solar cells for charging the battery.

18. The drive system of claim 16, further comprising an electric pump driven by the battery for pumping air into the air storage tank.

19. The drive system of claim 18, further comprising an auxiliary air storage tank connected to the air pump and to the air storage tank via the electric air pump, wherein the air pump pumps air into the auxiliary air storage tank when driven by the propeller, and wherein the electric pump pumps air from the auxiliary air storage tank to the air storage tank.

* * * * *